US010253911B1

(12) United States Patent
Quang

(10) Patent No.: US 10,253,911 B1
(45) Date of Patent: Apr. 9, 2019

(54) QUICK DISCONNECT COUPLING WITH SELECTIVE MATING CAPABILITY

(71) Applicant: AdelWiggins Group, a Division of Transdigm Inc., Los Angeles, CA (US)

(72) Inventor: Christopher Quang, Pasadena, CA (US)

(*) Notice: Subject to any disclaimer, the term of this patent is extended or adjusted under 35 U.S.C. 154(b) by 0 days.

(21) Appl. No.: 15/720,672

(22) Filed: Sep. 29, 2017

(51) Int. Cl.
*F16L 37/086* (2006.01)
*F16L 37/40* (2006.01)
*F16L 37/12* (2006.01)

(52) U.S. Cl.
CPC ........... *F16L 37/086* (2013.01); *F16L 37/123* (2013.01); *F16L 37/40* (2013.01); *Y10T 137/87957* (2015.04)

(58) Field of Classification Search
CPC ....... F16L 37/0826; F16L 37/23; F16L 37/40; F16L 37/08; F16L 37/30; F16L 37/32; F16L 37/33; F16L 37/34; F16L 37/35; F16L 37/36; F16L 37/38; F16L 37/407; F16L 37/413; F16L 37/42; F16L 37/44; F16L 37/113; F16L 15/04; F16L 29/00; F16L 29/02; F16L 29/04; F16L 55/1015; F16L 2201/10; F16L 2201/60; F16L 37/086; Y10T 137/87925; Y10T 137/87933; Y10T 137/87941; Y10T 137/87949; Y10T 137/87957; Y10T 137/87965; Y10T 137/87923
USPC ................ 137/614–614.06, 798; 251/149.1, 251/149.6–149.9; 285/306, 316
See application file for complete search history.

(56) References Cited

U.S. PATENT DOCUMENTS

| | | | | |
|---|---|---|---|---|
| 2,473,973 A | * | 6/1949 | Scheiwer | F16L 37/23 285/277 |
| 2,854,259 A | * | 9/1958 | Clark | F16L 37/23 137/614.03 |
| 3,039,794 A | * | 6/1962 | De Cenzo | F16L 37/1215 137/614.03 |
| 3,097,867 A | * | 7/1963 | Saloum | F16L 37/23 137/614.03 |
| 3,224,728 A | * | 12/1965 | Buseth | F16L 37/23 137/614.03 |
| 3,646,964 A | * | 3/1972 | Stratman | F16L 37/23 137/614.03 |
| 4,086,939 A | * | 5/1978 | Wilcox | F16L 37/23 137/614.03 |
| 4,219,048 A | * | 8/1980 | Ekman | F16L 37/23 137/614.03 |
| 4,289,164 A | * | 9/1981 | Ekman | F16L 37/23 137/614.03 |
| 4,564,042 A | * | 1/1986 | Ekman | F16L 37/23 137/614.03 |

(Continued)

*Primary Examiner* — Craig J Price
(74) *Attorney, Agent, or Firm* — Fulwider Patton LLP

(57) ABSTRACT

A quick disconnect incorporates a male component (nipple) and a female component (socket) that cooperate to form the fluid tight coupling. The nipple at the mating end includes at the outer surface a stepped end forming first and second diameters that are inserted into the socket. The socket includes first and second sleeves, where only the precise stepped end will fit through the sleeves and open the valve of the coupling. The internal fluid path remains identical across all variations of the stepped end and mating sleeves, and many different variations of the quick disconnect valve can be constructed with only minor changes to the stepped end and sleeves.

9 Claims, 5 Drawing Sheets

(56) References Cited

U.S. PATENT DOCUMENTS

| | | | | |
|---|---|---|---|---|
| 4,597,413 A * | 7/1986 | Buseth | F16L 37/413 | 137/614.04 |
| 4,614,348 A * | 9/1986 | Fournier | F16J 15/166 | 277/625 |
| 4,742,850 A * | 5/1988 | Ekman | F16L 37/23 | 137/614.03 |
| 4,917,149 A * | 4/1990 | Grantham | F16L 55/1015 | 137/614.03 |
| 5,014,743 A * | 5/1991 | Makishima | F16L 37/23 | 137/614.03 |
| 5,063,965 A * | 11/1991 | Wilcox | F16L 37/32 | 137/614.03 |
| 5,072,755 A * | 12/1991 | Wilcox | E21B 33/038 | 137/614.03 |
| 5,076,325 A * | 12/1991 | Ekman | F16L 37/23 | 137/614.03 |
| 5,159,955 A * | 11/1992 | Ekman | F16L 37/23 | 137/614 |
| 5,179,976 A * | 1/1993 | Boland | F16L 37/23 | 137/614.04 |
| 5,215,122 A * | 6/1993 | Rogers | F16L 29/04 | 137/614.04 |
| 5,443,291 A * | 8/1995 | Stucchi | F16L 29/04 | 137/614.03 |
| 5,662,141 A * | 9/1997 | Arosio | F16L 29/04 | 137/614.03 |
| 5,709,243 A * | 1/1998 | Wells | F16L 37/23 | 137/614.01 |
| 5,730,185 A * | 3/1998 | Wilkins | F16L 37/30 | 137/614.05 |
| 5,855,227 A * | 1/1999 | Stucchi | F16L 37/34 | 137/614.03 |
| 5,873,386 A * | 2/1999 | Arosio | F16L 37/30 | 137/614.02 |
| 5,884,897 A * | 3/1999 | Arosio | F16L 37/23 | 137/614.03 |
| 5,988,697 A * | 11/1999 | Arosio | F16L 37/23 | 285/124.1 |
| 5,996,624 A * | 12/1999 | Ekman | F16L 37/34 | 137/614.03 |
| 6,095,190 A * | 8/2000 | Wilcox | F16L 37/23 | 137/614 |
| 6,158,717 A * | 12/2000 | Van Scyoc | F16L 37/34 | 137/614.02 |
| 6,179,001 B1 * | 1/2001 | Schutz | F16L 37/565 | 137/614.01 |
| 6,220,291 B1 * | 4/2001 | Horton | E02F 3/3627 | 137/614 |
| 6,283,151 B1 * | 9/2001 | Countryman | F16L 37/413 | 137/614 |
| 6,382,251 B1 * | 5/2002 | Hopson | F16L 37/23 | 137/614 |
| 6,814,340 B2 * | 11/2004 | Arosio | F16L 37/34 | 137/614.03 |
| 7,497,231 B2 * | 3/2009 | Sasa | F16L 37/0848 | 137/614.05 |
| 7,575,024 B2 * | 8/2009 | Zeiber | F16L 29/04 | 137/614.03 |
| 7,793,914 B2 * | 9/2010 | Danielson | F16L 37/0848 | 251/149.6 |
| 7,942,163 B2 * | 5/2011 | Sauer | F16L 29/007 | 137/614.03 |
| 7,946,627 B2 * | 5/2011 | Allevi | F16L 29/02 | 285/101 |
| 8,205,914 B2 * | 6/2012 | Chappaz | F16L 37/23 | 285/276 |
| 8,602,056 B2 * | 12/2013 | Schutz | F16L 37/34 | 137/614.03 |
| 9,103,480 B2 * | 8/2015 | Tiberghien | F16L 37/46 | |
| 9,194,634 B2 * | 11/2015 | Tiberghien | F28F 27/00 | |
| 9,347,594 B2 * | 5/2016 | Rusconi | F16L 37/56 | |
| 9,708,173 B2 * | 7/2017 | Ballard | B67D 7/42 | |
| 9,791,087 B2 * | 10/2017 | Boothe | F16L 55/1015 | |
| 9,810,360 B2 * | 11/2017 | Lemay | F16L 37/34 | |
| 9,845,909 B2 * | 12/2017 | Lehmann | F16L 37/22 | |
| 9,879,811 B2 * | 1/2018 | Gennasio | F16L 29/007 | |
| 2003/0145892 A1 * | 8/2003 | Maldavs | F16L 37/23 | 137/614.03 |
| 2004/0079423 A1 * | 4/2004 | Mikiya | F16L 37/34 | 137/614.03 |
| 2005/0116466 A1 * | 6/2005 | Arosio | F16L 37/34 | 285/80 |
| 2008/0271797 A1 * | 11/2008 | Zeiber | F16L 29/04 | 137/614.05 |
| 2015/0377402 A1 * | 12/2015 | Boothe | F16L 55/1015 | 251/149.7 |
| 2016/0040815 A1 * | 2/2016 | Gennasio | F16L 29/04 | 137/798 |
| 2016/0047503 A1 * | 2/2016 | Ballard | F16L 37/34 | 251/149.7 |
| 2016/0047504 A1 * | 2/2016 | Gennasio | F16L 37/23 | 251/149.6 |
| 2017/0138522 A1 * | 5/2017 | Foner | F16L 37/34 | |
| 2017/0336005 A1 * | 11/2017 | Wada | F16L 37/32 | |

* cited by examiner

QUICK DISCONNECT COUPLING WITH SELECTIVE MATING CAPABILITY

BACKGROUND

Fluid quick disconnect couplings are well known in many industries, including industrial, aerospace, automotive, agricultural, etc. The need to quickly and reliably attach a fluid source to a hose or fluid client has made the quick disconnect coupling a standard component of most fluid systems. Quick disconnects improve performance by simplifying connections/disconnections and preventing fluid leakage, and typically eliminate the need for special tools to engage and disengage the coupling since most disconnects are actuated by hand.

There are a wide variety of fluid quick disconnect couplings in the art. Snap type (ball latching) quick disconnects are designed with a spring loaded ball latching mechanism that automatically locks the two halves of the fitting together when they are pushed together. When the releasing sleeve is pulled back, the internal end and external ends quickly disengage from each other. This quick release feature is advantageous in designs that require numerous connections throughout the life cycle of the product because they are so simple to operate. Alternatively, non-latching quick disconnects are used in applications where quick serviceability in a compact envelope is required. Typically, a non-latching quick disconnect is selected when a portion of the device requires frequent change out or when the releasing sleeve may be inaccessible. No shut-off quick disconnects are used when high flow rates are required. They are generally limited to applications involving low pressure air or other non-hazardous gases because the fluid is not contained in either half of the assembly upon disconnection. In single shut-off quick disconnects, the internal half of the assembly contains a valve preventing flow from escaping. This design is advantageous when one wishes to fill or evacuate pressure from a chamber or portable device and then disconnect the fill line. Double shut-off quick disconnects have shut-off valves within both the internal and external ends. These shut-off valves retain pressure in both fluid lines when the assembly is disconnected. This is ideal when the fluid is a liquid, an expensive gas, or flammable gas (also consider a "dry break" quick disconnect).

In many industries, such as in the mining industry, a haul truck or excavator may have the need to supply multiple fluids on site to machinery or other vehicles. Fluids such hydraulic oil, transmission oil, coolant, and the like are supplied by the haul truck to the machinery through hoses with quick disconnect connectors. One issue that arises in this environment and similar situations is that simply color coding the hoses and disconnects for the specific fluids does not ensure that the user will apply the proper connections. Dirt, grease, and spillage can obscure color codings and markings, and lead to incorrect connections. For this reason, each fluid must have a different mechanical connection to prevent the wrong fluid from being delivered to the machinery.

Non-interchangeability is most simply achieved by progressively increasing the sizes of the couplings, including valves, seals, springs, etc. However, this approach has several shortcomings. First, different sized couplings will have different flow rate performances (the smallest inner diameter will have the highest pressure drop and vice versa), which requires that the user must assess which fluids will work best with each sized coupling based on viscosity and other fluid properties in order to maximize the performance of the fluid transfers. Second, by requiring each coupling to have different sizes and different components (springs, seals, etc.), manufacturing costs are increased for each variation of the coupling.

The industry is in need of a quick disconnect coupling that can assume multiple configurations made substantially of common components and achieving an identical flow path, eliminating the need to analyze which quick disconnect would be best served for a particular fluid.

SUMMARY OF THE INVENTION

The present invention is a quick disconnect coupling that can take one of multiple forms, each with an identical flow path. In a preferred embodiment, the quick disconnect is a flush or flat face disconnect that incorporates a male component (nipple) and a female component (socket) that cooperate to form the fluid tight coupling. The nipple at the mating end includes at the outer surface a stepped end forming first and second diameters that are inserted into the socket. The socket includes first and second sleeves, where only the precise stepped end will fit through the sleeves and open the valve of the coupling. The internal fluid path remains identical across all variations of the stepped end and mating sleeves, and many different variations of the quick disconnect valve can be constructed with only minor changes to the stepped end and sleeves.

These and other features of the present invention will best be understood with reference to the detailed description of the preferred embodiments along with the accompanying figures set forth below.

DETAILED DESCRIPTION OF THE PREFERRED EMBODIMENTS

Figure 1:
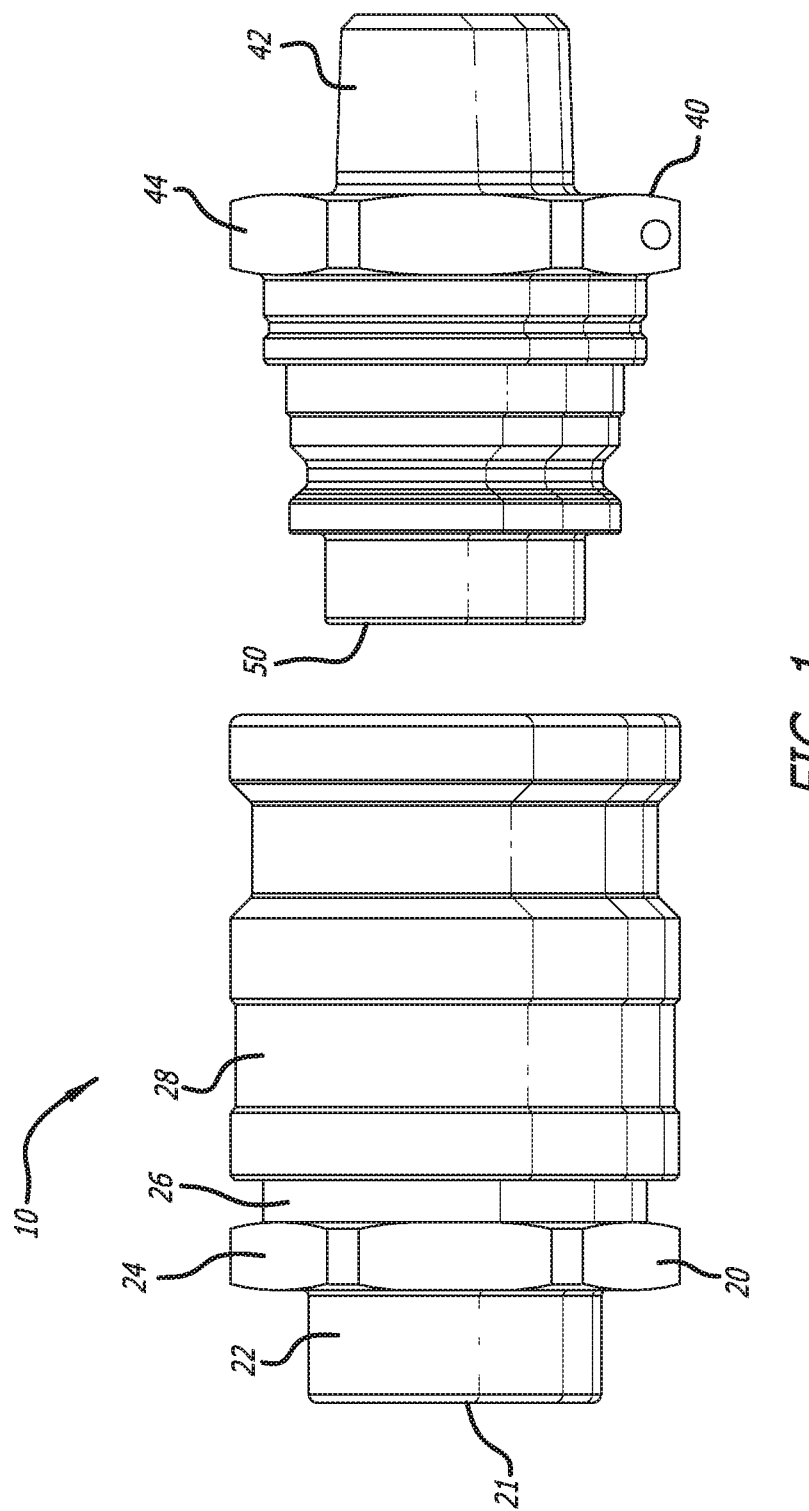
FIG. 1 is a side view of a first preferred embodiment of the present invention.
Figure 2:
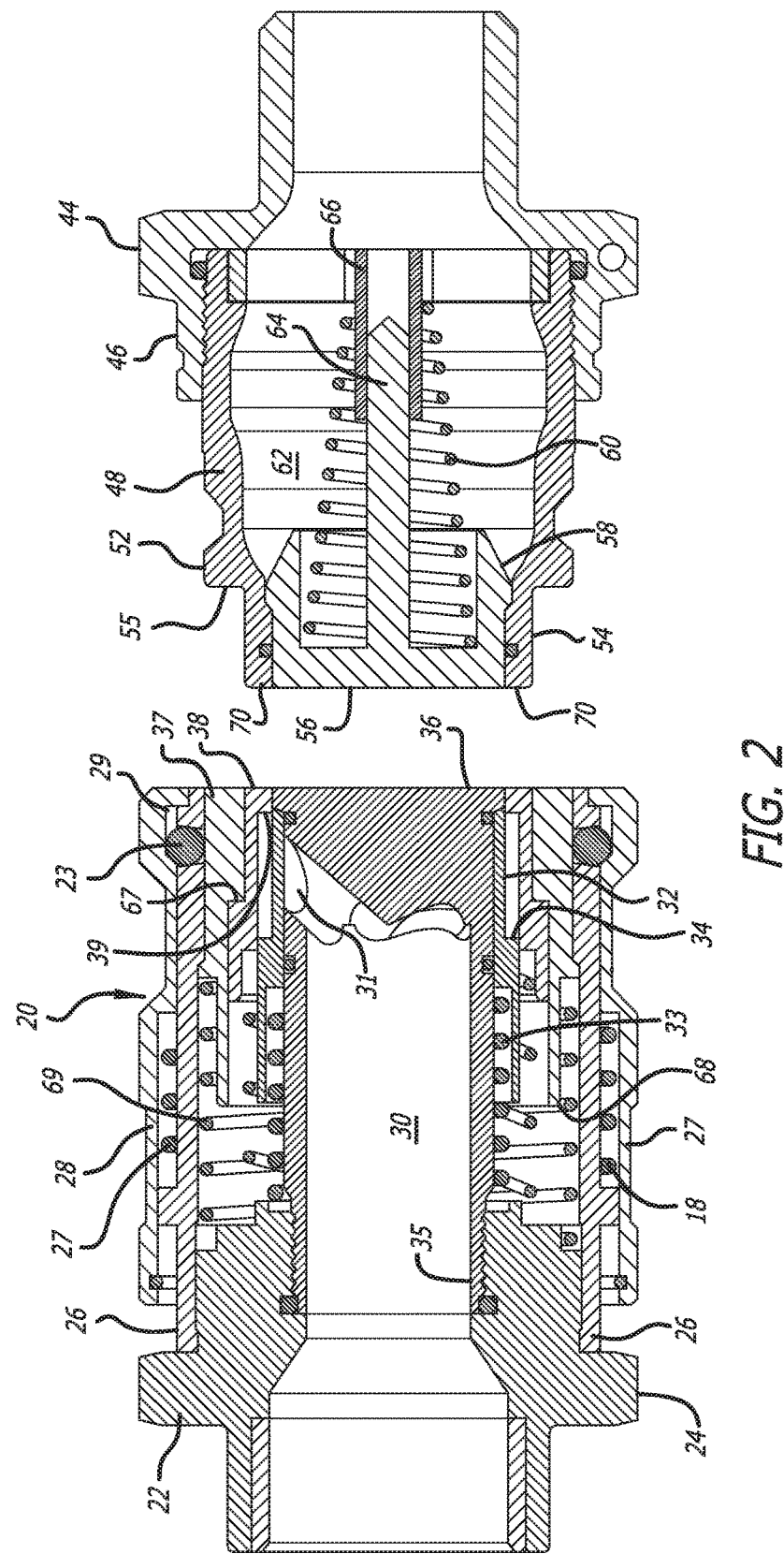
FIG. 2 is a cross sectional view of the embodiment of FIG. 1.

FIGS. 1 and 2 illustrate the two main components of the quick disconnect coupling 10 of the present invention, namely a socket 20 and a nipple 40. Socket 20 is comprised of a base 22 having an outlet 21 and an hexagonal ridge 24. A cylindrical housing 26 is mounted on the base 22 and abuts the hexagonal ridge 24, and the cylindrical housing 26 supports a spring biased collar 28 that is biased toward an outlet end of the cylindrical housing 26 by spring 27. The spring biased collar 28 includes an annular cavity 29 in which a row of locking balls 23 are disposed that are used to engage the nipple 40 in a releasable snap connection as is known in the art.

The hollow socket 20 has an interior portion 30 with a flow pathway 31 that is occluded by inner sleeve 32, which is biased toward the outlet side by spring 33. Unless sleeve 32 is retracted, flow will not pass through the socket 20. Sleeve 32 is formed with a shoulder 34, and moves longitudinally on a threaded tubular element 35 connected to the base and forming a substantially flush outlet face 36 of the socket 20. Seals are preferably disposed between the tubular element 35 and the sleeve 32 for preventing fluid from leaking into the exterior compartments of the socket 20. A first sleeve 32 having a first outer radius along a first portion of its length and a second outer radius along a second portion of its length, the first outer radius having a greater value than the second outer radius, and the first sleeve 32 biased by a first spring 33 to block the fluid pathway 31.

Between the inner sleeve 32 and the housing 26 are a pair of spring actuated nested, interlocking sleeves 37,38 having proximal surfaces flush with the outlet face 36 of the threaded tubular element 35. The sleeve 38 includes a stepped surface 39 bearing against the sleeve 32 such that a longitudinal displacement of the sleeve 38 causes the stepped surface 39 to drive the shoulder 34 of the sleeve 32 against the bias of the spring 33 to open the pathway 31 of the socket 20. Therefore, the arrangement of the nipple and socket must be such that the sleeve 38 is retracted into the socket 20, carrying the sleeve 32 past the opening of the pathway 31, so that fluid may bypass the sleeve 32. Interlocking sleeve 37 is formed such that, if sleeve 38 is pushed inward into the socket 20 by the nipple 40 against the bias of spring 19, sleeve 38 will not be affected and will remain biased toward the outlet end by spring 18. However, the interlocking nature of sleeves 37 and 38 are such that displacement of sleeve 37 inward carries sleeve 38 inward by the same distance by the engagement of sleeves 37 and 38. The distance that each sleeve 37,38 can travel is selected so that only the correct axial displacements of the sleeves 37,38 will open the socket, which will be dictated by the geometry of the nipple and the stepped distal end. A second sleeve 38 at a first radial position biased by a second spring 19 in a flush position, the second sleeve 38 including an interfering element 39 with the first sleeve 32 for axially displacing the first sleeve 32 when the second sleeve 38 is displaced axially where the second sleeve 38 is radially seated against the first sleeve 32 along both the first outer radius and second outer radius of the first sleeve 32.

Turning to the nipple 40, a stem 42 includes an hexagonal ridge 44 and an annular ring 46 that retains a cylindrical housing 48. The cylindrical housing 48 has a proximal end 50 that includes a first outer diameter 52 and a second outer diameter 54, the second outer diameter 54 smaller than the first outer diameter with a shoulder 55 separating the two diameters. The proximal end 50 further includes a valve 56 having an occluding member 58 biased by a spring 60 against the opening of the nipple 40. In the undisturbed condition (FIG. 2), the occluding member 58 blocks the flow of fluid through the nipple. Only by retracting the occluding member of the valve 56 against the biasing of the spring 60 into the interior 62 of the nipple 40 can fluid flow through the nipple 40 around the occluding member 58. The occluding member 58 may include a centering stem 64 that is partially fixed in a cylindrical guide 66 to help guide the movement of the occluding member along the axis of the nipple 40.

Figure 3:
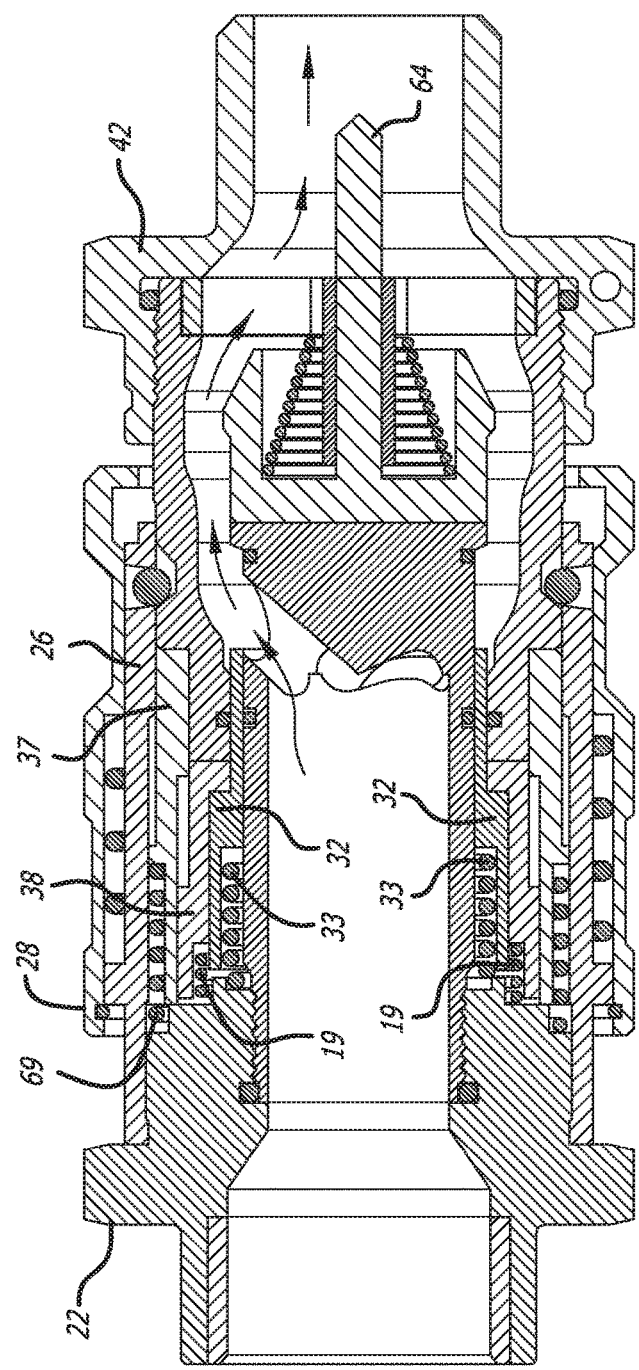
FIG. 3 is a cross sectional view of the embodiment of FIG. 1 with a matching nipple and socket in the engaged state.

When the correct size nipple 40 and socket 20 are arranged, the coupling will allow fluid to flow through, as shown in FIG. 3. In FIG. 3, the proximal face 70 of the nipple's cylindrical housing 48 is rigidly by virtue of the cylindrical housing's engagement with the stem 42 but the occluding member 58 can retract into the nipple's interior 62 against the bias of the spring 60. Similarly, the tubular element 35 of the socket 20 is fixed by the engagement to the base 22, but the sleeve 38 can retract into the socket's interior against the bias of the spring 19. In FIG. 3, the proximal face 70 of the nipple's cylindrical housing has the same diameter as the sleeve 38 of the socket 20, and when the two components are pushed together the cylindrical housing 48 of the nipple 20 retracts the sleeve 38 of the socket to its maximum displacement. By displacing the sleeve 38 to its maximum displacement, the inner sleeve 32 is bypassed to open the pathway 31 so that fluid can flow through the socket 20 as shown by the arrows.

Moreover, the shoulder 55 of the nipple's proximal end has an outer diameter that matches the diameter of the sleeve 37 of the socket 20 and the shoulder 55 displaces the sleeve 37 by the length of cylindrical housing from the shoulder to the proximal edge. This displacement of the sleeve 37 allows the tubular element 35 to displace the occluding member 58 of the nipple 40 and open the valve (see FIG. 3). Only by displacing both sleeves 37 and 38 as shown will the inner sleeve 32 of the socket be bypassed and the occluding member 58 of the nipple 40 be displaced. In this manner, the "key" to open the quick disconnect is not based on the size of the components but rather the mating ends that open the valve.

Figure 4:
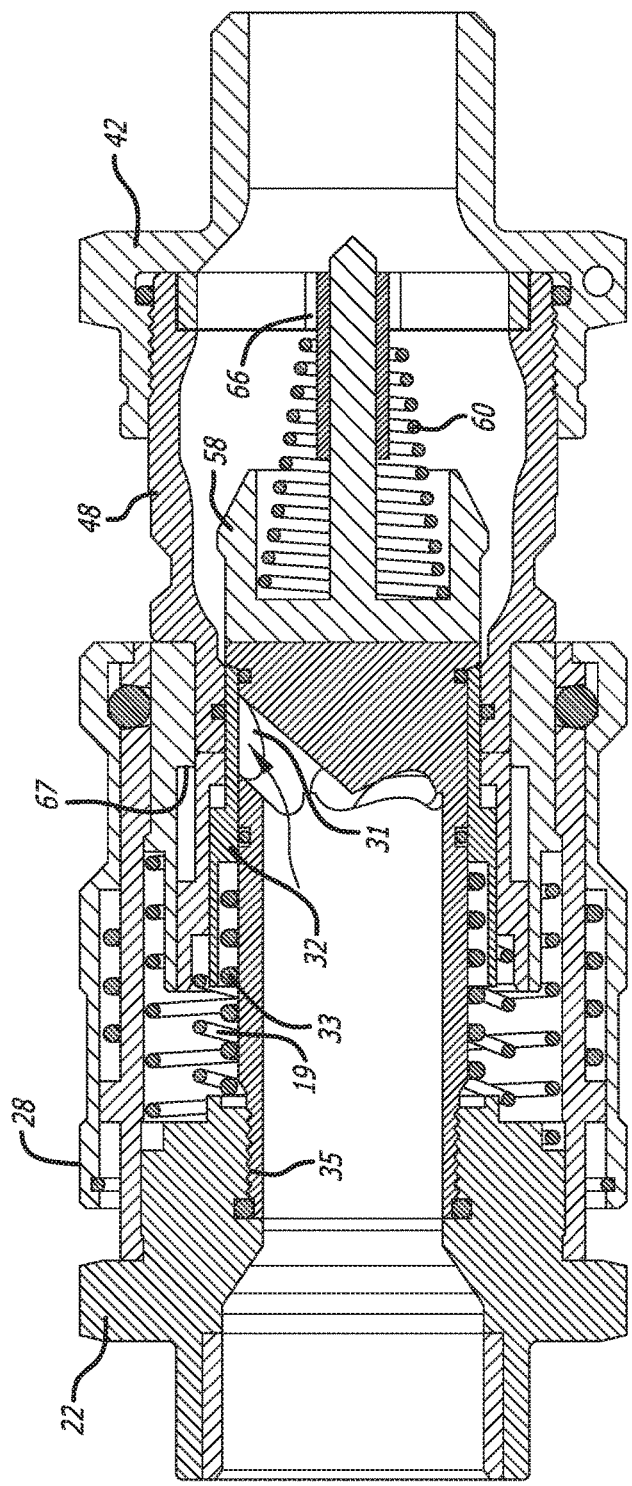
FIG. 4 is a cross sectional view of the first preferred embodiment of the present invention with a mismatched nipple (too large) and the socket of FIG. 1.

FIG. 4 illustrates the case where the socket is the same as in FIG. 3, but the nipple's shoulder has a slightly larger outer diameter. In this case, the proximal face 70 once again retracts the sleeve 38 as before, but only partially because the shoulder 55 is too large and cannot depress the sleeve 37. Although occluding member 58 is driven back from the closed position, sleeve 32 is still closed and thus fluid cannot pass through the coupling. Thus, the slightly larger shoulder prevents the valve from opening even though the sizes of the two components are unchanged except for the size of the shoulder of the nipple. The pathway 31 is blocked, and although valve 58 is partially open sleeve 32 blocks the flow of fluid and therefore no flow can pass through the coupling 10.

Figure 5:
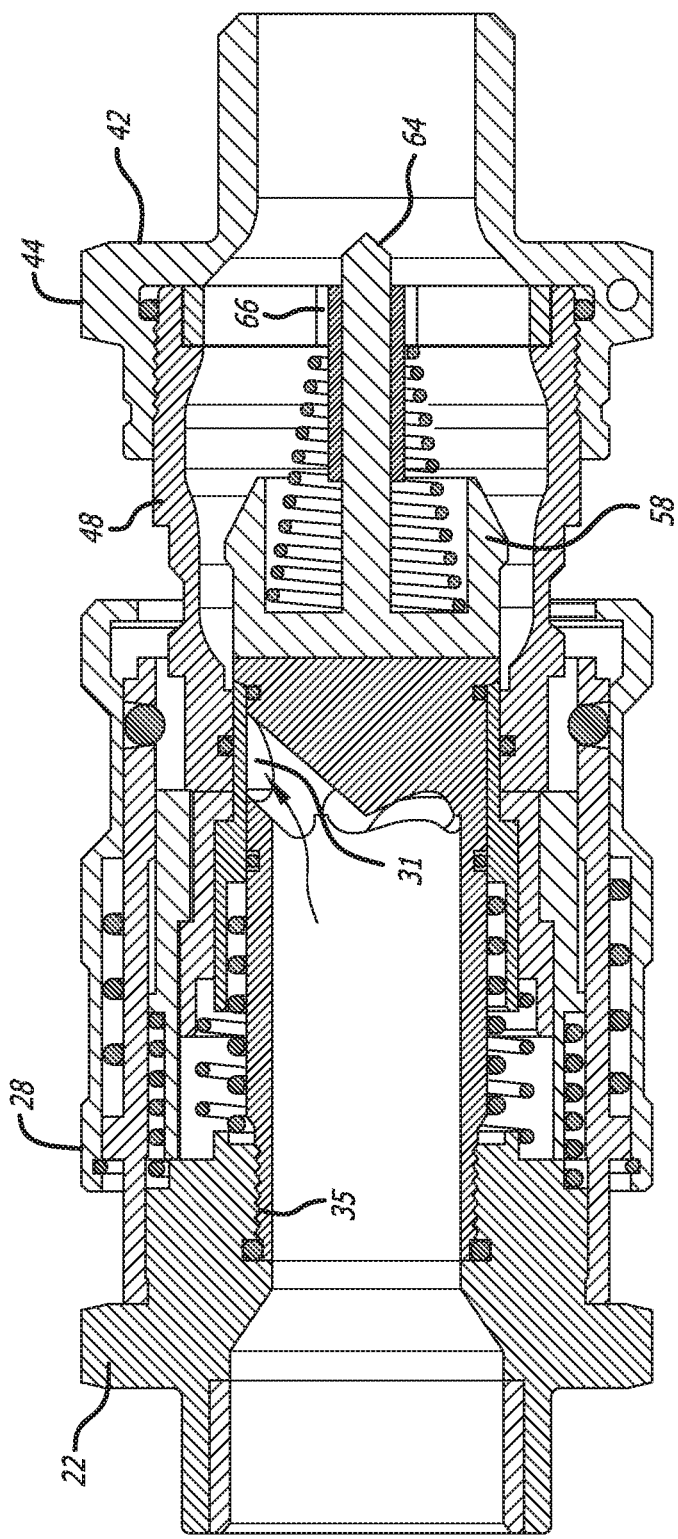
FIG. 5 is a cross sectional view of the first preferred embodiment of the present invention with a mismatched nipple (too small) and the socket of FIG. 1.

FIG. 5 illustrates the case where the diameter of the proximal face 70 is too large when compared with the example of FIG. 3. Here, the proximal face 70 engages and displaces both sleeves 38 and 37 instead of just 38 because the height of the proximal face is greater than the height of sleeve 38. When both sleeves 37 and 38 are displaced by the same amount by the proximal face 70 of the nipple, the interference of the sleeve 37 with the base 22 prevents the sleeve 38 from achieving the necessary depth to clear the sleeve 32 and open the pathway 31, which remains blocked. Further, the failure of the nipple to extend to its maximum depth in the socket as illustrated in FIG. 3, and sleeve 32 prevents flow of fluid through the coupling. A third sleeve 37 at a second radial position biased by a third spring 69 in a flush position, the third spring 69 disposed between the second sleeve 38 and a cylindrical housing 26 in the flush position, the third sleeve 37 including an interfering element 67 with the second sleeve 38 for axially displacing the second sleeve 38 when the third sleeve 37 is displaced axially and the third sleeve 37 further comprising a stop 68 that bears against the base 22 when the third sleeve 37 is maximally displaced from the flush position.

It is important that sleeves 38, 37 have diameters that match the proximal face 70 and shoulder 55, respectively, and converge (or diverge) rather than increase together or decrease together. That is, if the nipple 40 has a proximal face 70 and shoulder 55 that are both smaller than the corresponding diameters of the sleeves 38 and 37, respectively, the nipple and socket could mate and defeat the non-interchangeability of the invention.

Moreover, a set of multiple sockets and nipples can be created using the same components, as long as the rule is followed whereby a starting diameter "X" for the sleeve 38/proximal face 70 and starting diameter "Y" for the sleeve 37/shoulder 55 is selected (provided that the inner diameter of housing 26 matches the outer diameter 52 of cylindrical housing 48, and inner diameter of sleeve 37 matches outer diameter 54 of cylindrical housing 48). As long as the value of X increases as Y decreases, or vice versa, then there will be no crossover and the components will only work for their intended complimentary component. In this way, ten, twelve, or more couplings can be generated with the same diameter and flow characteristics without sacrificing any performance and without risking cross contamination of fluids due to mismatching of quick disconnects.

While the foregoing describes and depicts several preferred embodiments of the present invention, the scope of the present invention is not limited to those embodiments described or depicted. A person of ordinary skill in the art would readily recognize and appreciate that many modifications and substitutions would be available to the foregoing embodiments, and the present invention is intended to include all such modifications and substitutions. Thus, the present invention is properly measured not by any limiting language or depiction herein, but rather by the words of the appended claims using their plain and ordinary meanings consistent with this disclosure.

I claim:

1. A quick disconnect coupling comprising:
   a socket comprising:
      a tubular member rigidly mounted against a base, the tubular member including a fluid pathway;
      a first sleeve having a first outer radius along a first portion of its length and a second outer radius along a second portion of its length, the first outer radius having a greater value than the second outer radius, and the first sleeve biased by a first spring to block the fluid pathway;
      a second sleeve at a first radial position biased by a second spring in a flush position, the second sleeve including an interfering element with the first sleeve for axially displacing the first sleeve when the second sleeve is displaced axially where the second sleeve is radially seated against the first sleeve along both the first outer radius and second outer radius of the first sleeve;
      a third sleeve at a second radial position biased by a third spring in a flush position, the third spring disposed between the second sleeve and a cylindrical housing in the flush position, the third sleeve including an interfering element with the second sleeve for axially displacing the second sleeve when the third sleeve is displaced axially and the third sleeve further comprising a stop that bears against the base when the third sleeve is maximally displaced from the flush position;
   and
   a nipple comprising:
      a valve biased by a spring in a closed position;
      a cylindrical housing having an annular proximal end with a shoulder spaced therefrom, the annular proximal end disposed at the first radial position and the shoulder disposed at the second radial position;
      whereby engagement of the nipple with the socket displaces the second sleeve of the socket by the proximal end of the nipple to move the first sleeve from the fluid pathway; and
      whereby the shoulder of the nipple displaces the third sleeve of the socket to allow the tubular member to overcome the bias of the spring and open the valve.

2. The quick disconnect coupling of claim 1, wherein the valve includes a stem and a cylindrical guide to guide an occluding member along an axial direction.

3. The quick disconnect coupling of claim 1, wherein the valve will only open if the proximal end of the nipple passes narrowly between the first sleeve and third sleeve.

4. The quick disconnect coupling of claim 1, wherein the socket has a substantially flush surface at an interface with the nipple.

5. The quick disconnect coupling of claim 1, wherein the nipple includes an occluding member having a surface flush with an interface of the socket.

6. The quick disconnect coupling of claim 1, wherein the second and third sleeves are interlocking.

7. The quick disconnect coupling of claim 1, wherein the socket further comprises a biased collar over a cylindrical housing.

8. The quick disconnect coupling of claim 1, further comprising a second quick disconnect coupling having a socket and a nipple, whereby the nipple of the second quick disconnect coupling does not mate with the socket of the first quick disconnect coupling and the socket of the second quick disconnect coupling does not mate with the nipple of the first quick disconnect coupling, where the only difference between the first disconnect coupling and the second disconnect coupling is the first radial position of the annular proximal end and second radial position of the shoulder of the nipples.

9. The quick disconnect coupling of claim 7, further comprising a plurality of locking balls disposed within the biased collar.

* * * * *